US012744980B2

(12) United States Patent
Kameyama

(10) Patent No.: US 12,744,980 B2
(45) Date of Patent: Sep. 22, 2026

(54) VEHICULAR CAMERA HAVING A TUBULAR LENS UNIT AND A TUBULAR HOUSING

(71) Applicant: Panasonic Automotive Systems Co., Ltd., Kanagawa (JP)

(72) Inventor: Shingo Kameyama, Hyogo (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 16 days.

(21) Appl. No.: 18/925,899

(22) Filed: Oct. 24, 2024

(65) Prior Publication Data

US 2025/0142190 A1 May 1, 2025

(30) Foreign Application Priority Data

Oct. 30, 2023 (JP) ................................ 2023-185816

(51) Int. Cl.

*H04N 23/51* (2023.01)
*B60R 16/023* (2006.01)
*G02B 7/02* (2021.01)
*G03B 30/00* (2021.01)
*H04N 23/57* (2023.01)

(52) U.S. Cl.

CPC .......... *H04N 23/51* (2023.01); *B60R 16/023* (2013.01); *G02B 7/02* (2013.01); *G03B 30/00* (2021.01); *H04N 23/57* (2023.01)

(58) Field of Classification Search

CPC ...................................................... H04N 23/51
See application file for complete search history.

(56) References Cited

U.S. PATENT DOCUMENTS 8,520,070 B1 * 8/2013 Englander .............. H04N 5/772 348/148
10,623,611 B2 * 4/2020 Zurowski ............. H05K 5/0026
11,543,618 B2 * 1/2023 Hirao ..................... G02B 5/005
12,328,491 B1 * 6/2025 Sesti ...................... G02B 7/003
2016/0202443 A1 * 7/2016 Knutsson ............... H04N 23/51 348/148
2017/0343831 A1 * 11/2017 Bakin ................ G02B 27/0012
2019/0103716 A1 * 4/2019 Yamazaki ............ H01R 13/743
2019/0143907 A1 * 5/2019 Byrne .................. H01R 12/716 348/148
2021/0313746 A1 * 10/2021 Kato .................. H01R 13/6215

(Continued)

FOREIGN PATENT DOCUMENTS

JP 2018197798 A 12/2018

*Primary Examiner* — Irfan Habib
(74) *Attorney, Agent, or Firm* — Seed Intellectual Property Law Group LLP

(57) ABSTRACT

A vehicular camera includes a lens unit, a circuit board, an imaging element, and a housing. The imaging element has first sensitivity in a first wavelength band having a wavelength shorter than a predetermined wavelength, and second sensitivity smaller than the first sensitivity in a second wavelength band having a wavelength longer than the predetermined wavelength. A first resin of a first tubular portion and a flange portion has first light transmittance in the first wavelength band and second light transmittance larger than the first light transmittance in the second wavelength band. A second resin of the housing has a third light transmittance smaller than the second light transmittance at least in the second wavelength band.

13 Claims, 13 Drawing Sheets

(56) References Cited

U.S. PATENT DOCUMENTS

| | | | | |
|---|---|---|---|---|
| 2021/0384680 | A1* | 12/2021 | Yamazaki | H01R 12/716 |
| 2023/0080778 | A1* | 3/2023 | Owaki | B60R 11/04 348/148 |
| 2023/0236478 | A1* | 7/2023 | Lee | G03B 17/55 348/373 |
| 2024/0040217 | A1* | 2/2024 | Nakamura | G03B 17/55 |
| 2024/0364987 | A1* | 10/2024 | Dreiocker | H04N 23/57 |
| 2024/0380963 | A1* | 11/2024 | Lee | H04N 23/57 |
| 2024/0424999 | A1* | 12/2024 | Winden | B60R 1/24 |
| 2024/0427220 | A1* | 12/2024 | Conger | G03B 30/00 |
| 2025/0024125 | A1* | 1/2025 | Wöhlte | H04N 23/51 |
| 2025/0039526 | A1* | 1/2025 | Nakamura | H04N 23/54 |
| 2025/0133281 | A1* | 4/2025 | Kameyama | B60R 1/28 |
| 2025/0220288 | A1* | 7/2025 | Nakamura | H04N 23/51 |

* cited by examiner 100
60
61
62
63
64
90
92a,92
92c,92
92d,92
95
40
40a
40b
50
37a
37b
37c
37d
30
31
32
32b
32c
33
37
X
Y
Z

VEHICULAR CAMERA HAVING A TUBULAR LENS UNIT AND A TUBULAR HOUSING

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active (for example, see Patent Literature 1).

CITATION LIST

Patent Literature

Patent Literature 1: JP2018-197798A

SUMMARY OF INVENTION

Required levels relating to safety, automatic driving functions, and the like, which are required for vehicles, are improved, and further improvement in performance and the like are also required for vehicular cameras.

The present disclosure relates to a technique for providing a new vehicular camera.

A vehicular camera of the present disclosure includes a lens unit including a first tubular portion having a first tubular shape, at least one lens disposed inside the first tubular portion and on an optical axis, and a flange portion disposed outside the first tubular portion to extend outward with reference to the optical axis over an entire circumference centering on the optical axis; a circuit board including a first surface and a second surface opposite to the first surface; an imaging element disposed on the optical axis and on the first surface of the circuit board; and a housing configured to accommodate at least the circuit board and the imaging element and including a second tubular portion having a second tubular shape along the optical axis. The second tubular portion of the housing includes a first end, and a second end that is opposite to the first end and is disposed at a position farther than the first end with reference to the lens unit in a direction of the optical axis, the first tubular portion and the flange portion of the lens unit are integrally formed of a first resin, the housing is formed of a second resin, the first end of the second tubular portion of the housing is welded to the flange portion of the lens unit over the entire circumference centering on the optical axis, the imaging element has first sensitivity in a first wavelength band having a wavelength shorter than a predetermined wavelength, and second sensitivity smaller than the first sensitivity in a second wavelength band having a wavelength longer than the predetermined wavelength, the first resin of the first tubular portion and the flange portion has first light transmittance in the first wavelength band and second light transmittance larger than the first light transmittance in the second wavelength band, and the second resin of the housing has a third light transmittance smaller than the second light transmittance at least in the second wavelength band.

According to the present disclosure, since the first tubular portion and the flange portion of the lens unit are integrally formed of the first resin, the number of components and manufacturing processes can be reduced. In addition, while the first resin has the second light transmittance higher in the second wavelength band, the imaging element has the first sensitivity higher in the first wavelength band having a shorter wavelength than the second wavelength band. Thus, in the welding of the lens unit and the housing, by using laser light in the second wavelength band in which the sensitivity of the imaging element is low, which passes through the first resin, the welding can be smoothly performed while reducing an influence on the imaging element.

DESCRIPTION OF EMBODIMENTS

Hereinafter, embodiments that specifically disclose a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following description and facilitate understanding of those skilled in the art. It should be noted that the accompanying drawings and the following description are provided for those skilled in the art to sufficiently understand the present disclosure, and are not intended to limit the subject matter described in the claims.

Vehicle on Which Vehicular Camera is Mounted

Figure 1:
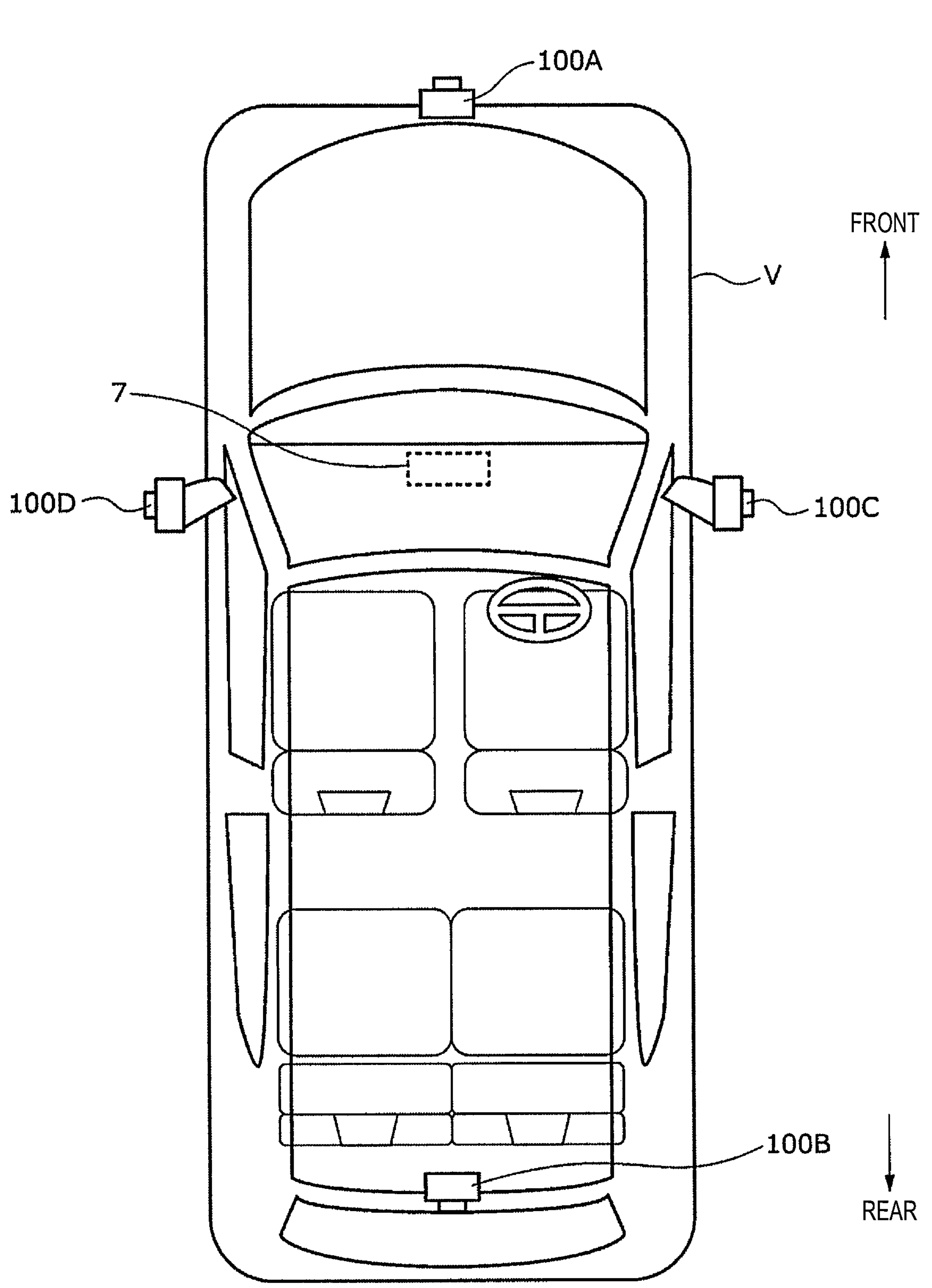
FIG. 1 is an example of a vehicle, and is a top view of the vehicle on which vehicular cameras are mounted.

FIG. 1 is an example of a vehicle, and is a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right side camera, and the vehicular camera 100D is a left side camera. The vehicular cameras 100A to 100D are, for example, wide-angle cameras having an angle of view of about 180°, and are disposed to capture images showing an entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 2:
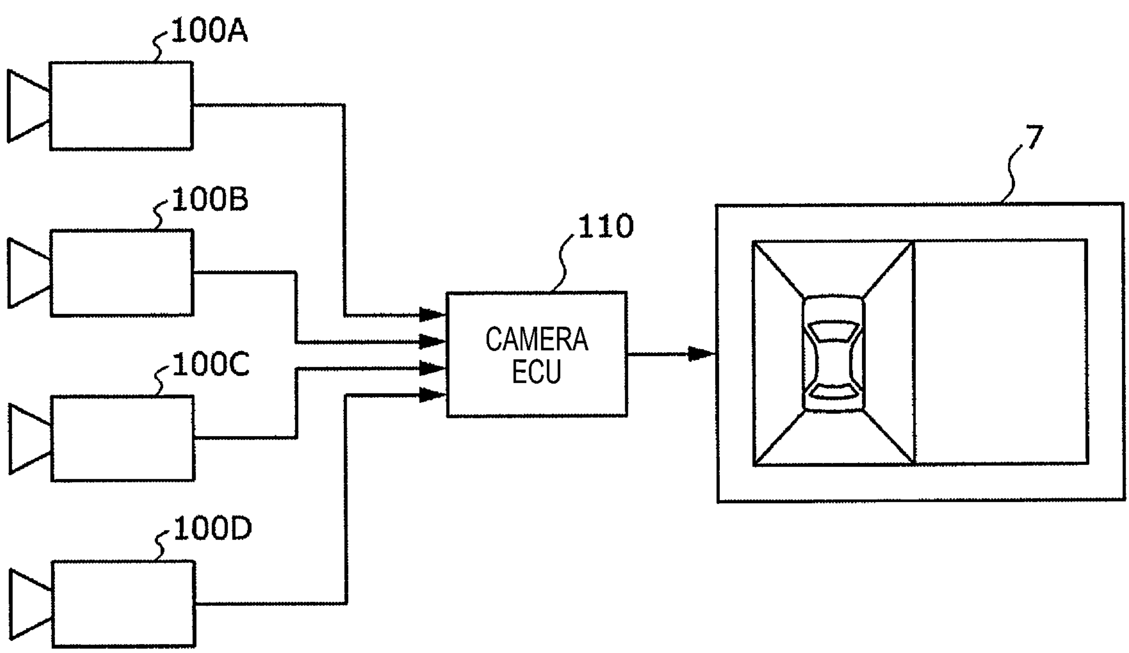
FIG. 2 is a block diagram illustrating a connection example of the vehicular cameras provided in the vehicle shown in FIG. 1, a camera ECU, and a display.

FIG. 2 is a block diagram illustrating a connection example of the vehicular cameras 100A to 100D provided in the vehicle V shown in FIG. 1, a camera ECU 110, and a display 7. The camera electronic control unit (ECU) 110 in FIG. 2 synthesizes the images captured by the vehicular cameras 100A to 100D, and displays a synthesized image on the display 7 of a navigation system disposed on an instrument panel, for example. An occupant can visually recognize the display 7 and check a situation around the vehicle V.

Figure 3:
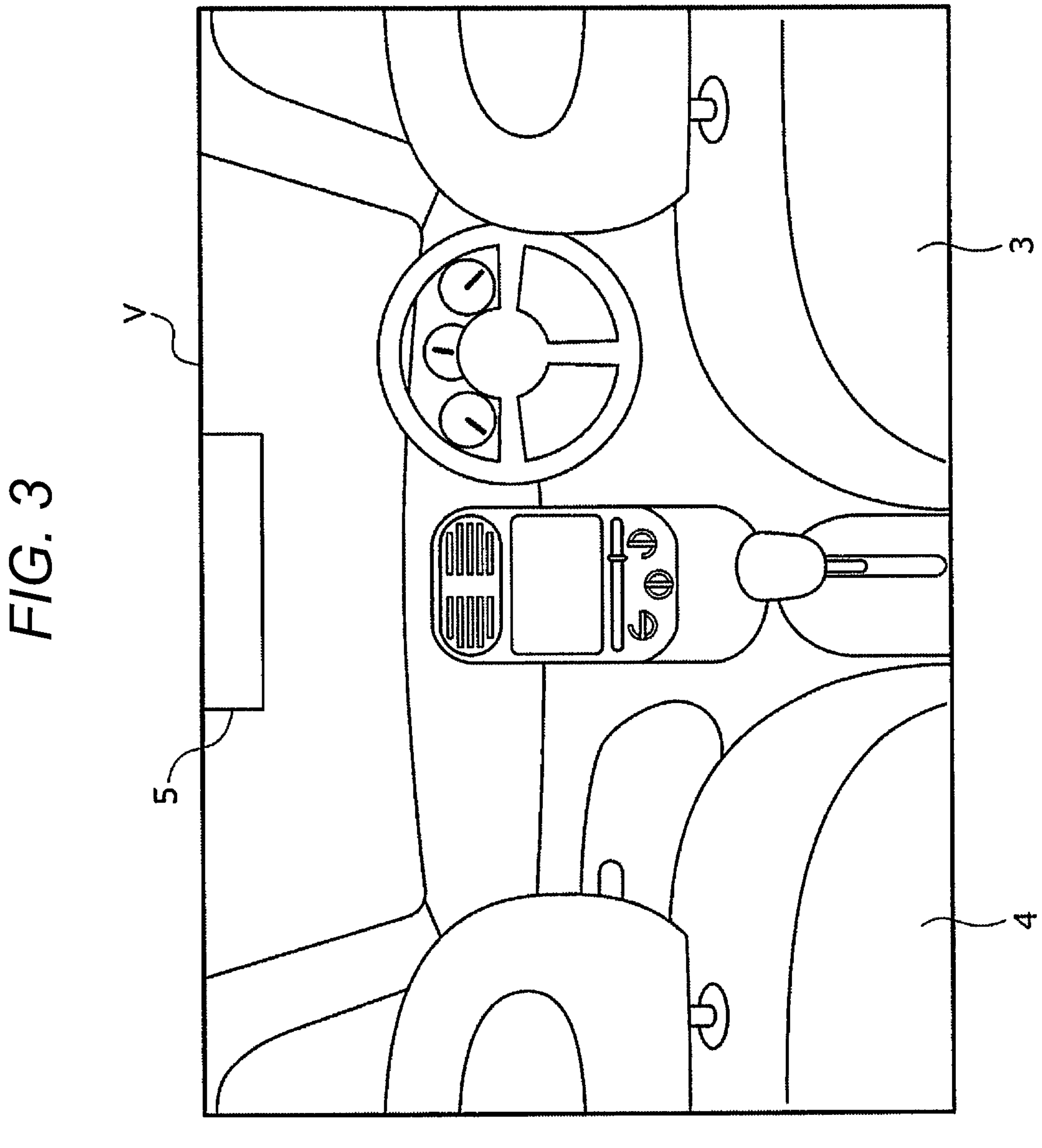
FIG. 3 is another example of the vehicle, and is a schematic diagram of a cabin of the vehicle on which a vehicular camera is mounted.
Figure 4:
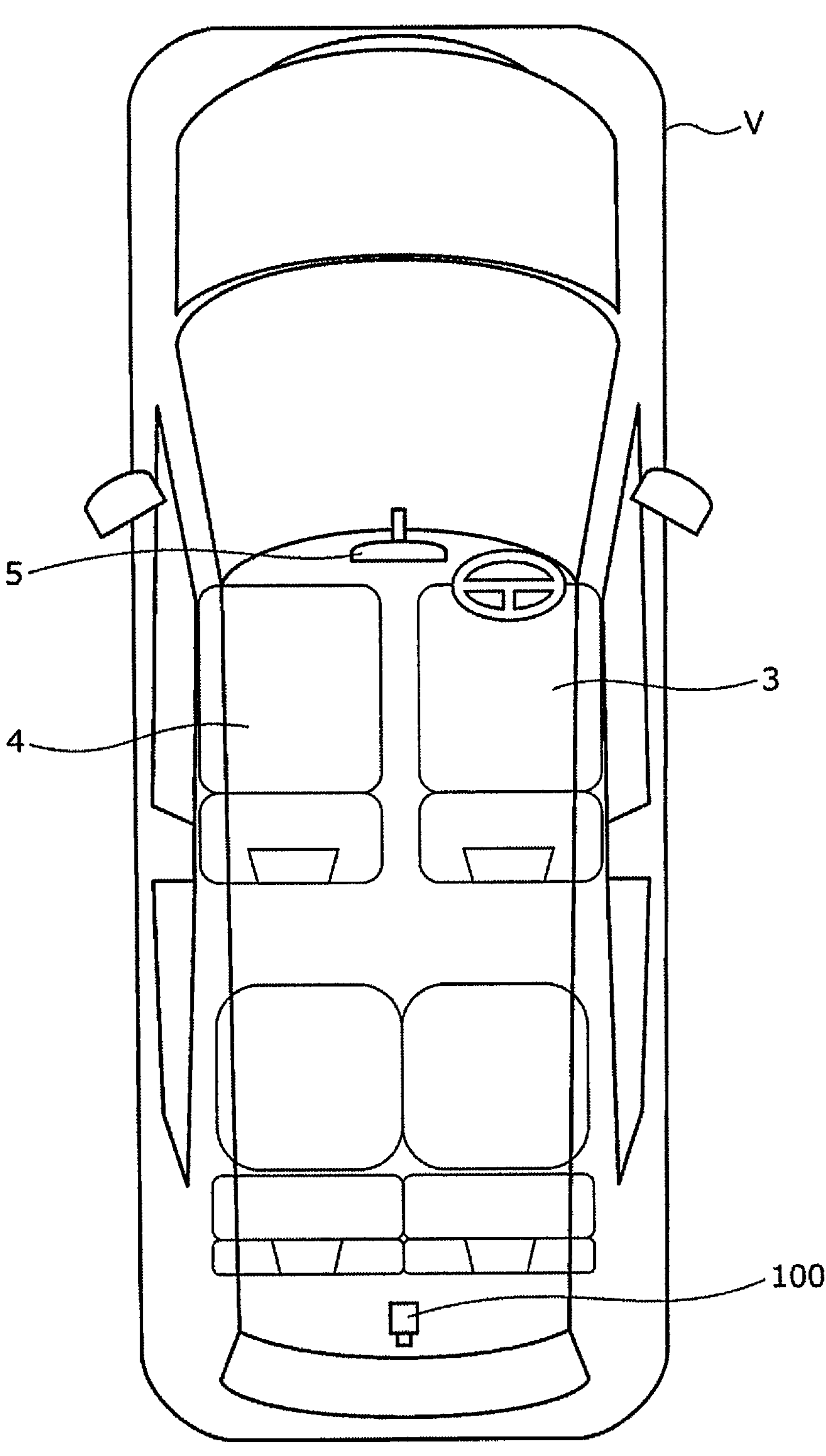
FIG. 4 is a top view of the vehicle in FIG. 3.
Figure 5:
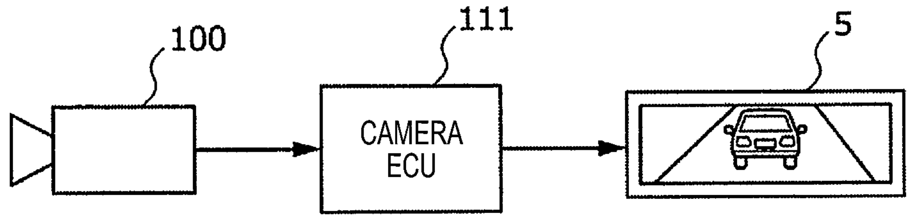
FIG. 5 is a block diagram illustrating a connection example of the vehicular camera provided in the vehicle shown in FIG. 3, a camera ECU, and a display device.

FIG. 3 is another example of the vehicle, and is a schematic diagram of a cabin of the vehicle on which the vehicular camera is mounted, and FIG. 4 is a top view of the vehicle in FIG. 3. The vehicle V includes a display device 5 (for example, an electronic rearview mirror) at an attachment position of a rearview mirror which is a front portion between a driver's seat 3 and a passenger seat 4 in a cabin 2. Further, the vehicle V is provided with the vehicular camera 100 at a rear side of a vehicle body. FIG. 5 is a block diagram illustrating a connection example of the vehicular camera 100 provided in the vehicle V shown in FIG. 3, a camera ECU 111, and the display device 5. The camera electronic control unit (ECU) 111 in FIG. 4 processes an image captured by the vehicular camera 100, and the display device 5 displays the image. The occupant can visually recognize the display device 5 and check a rear situation of the vehicle V.

Embodiment of Vehicular Camera

Figure 6:
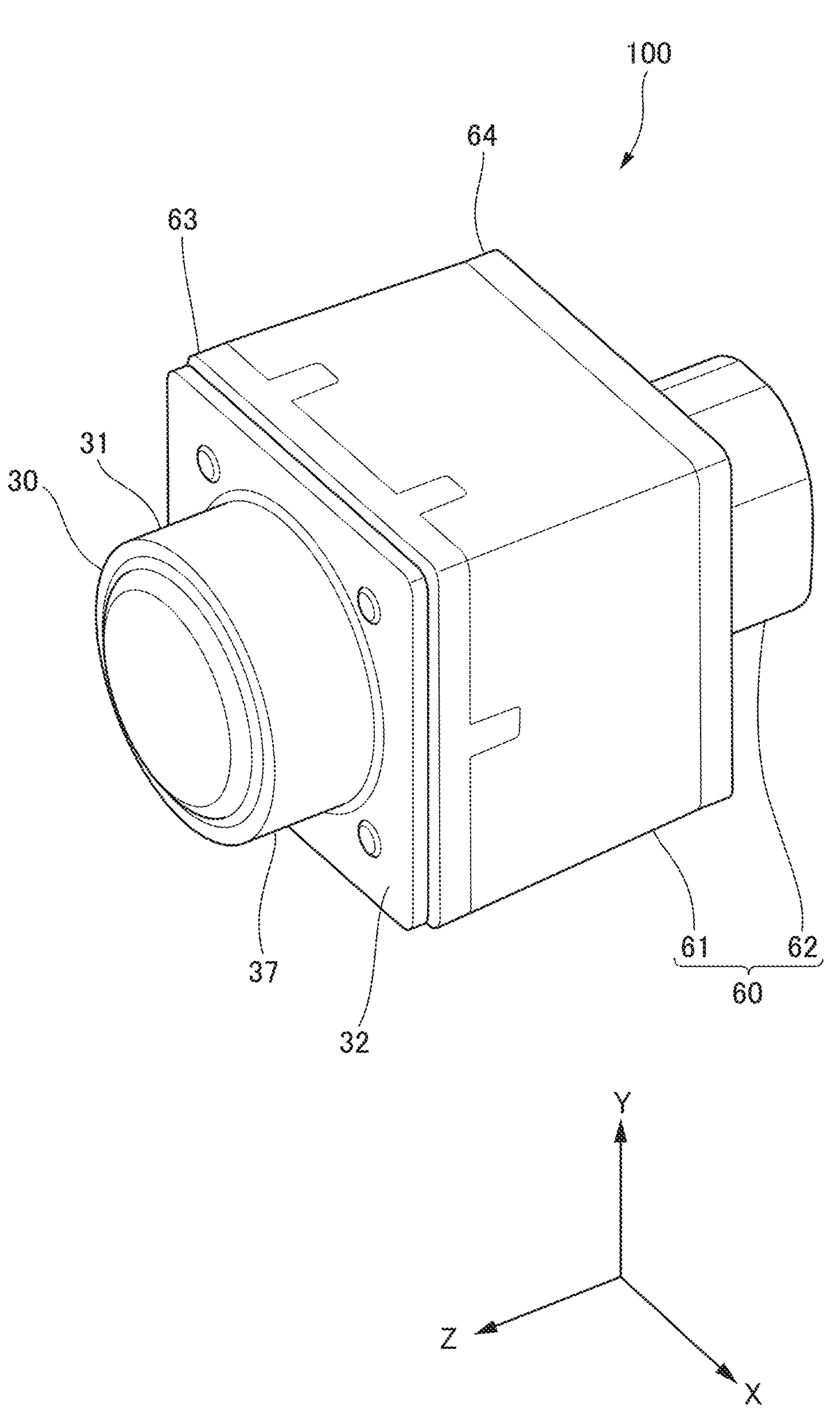
FIG. 6 is a front perspective view of the vehicular camera according to an embodiment.
Figure 7:
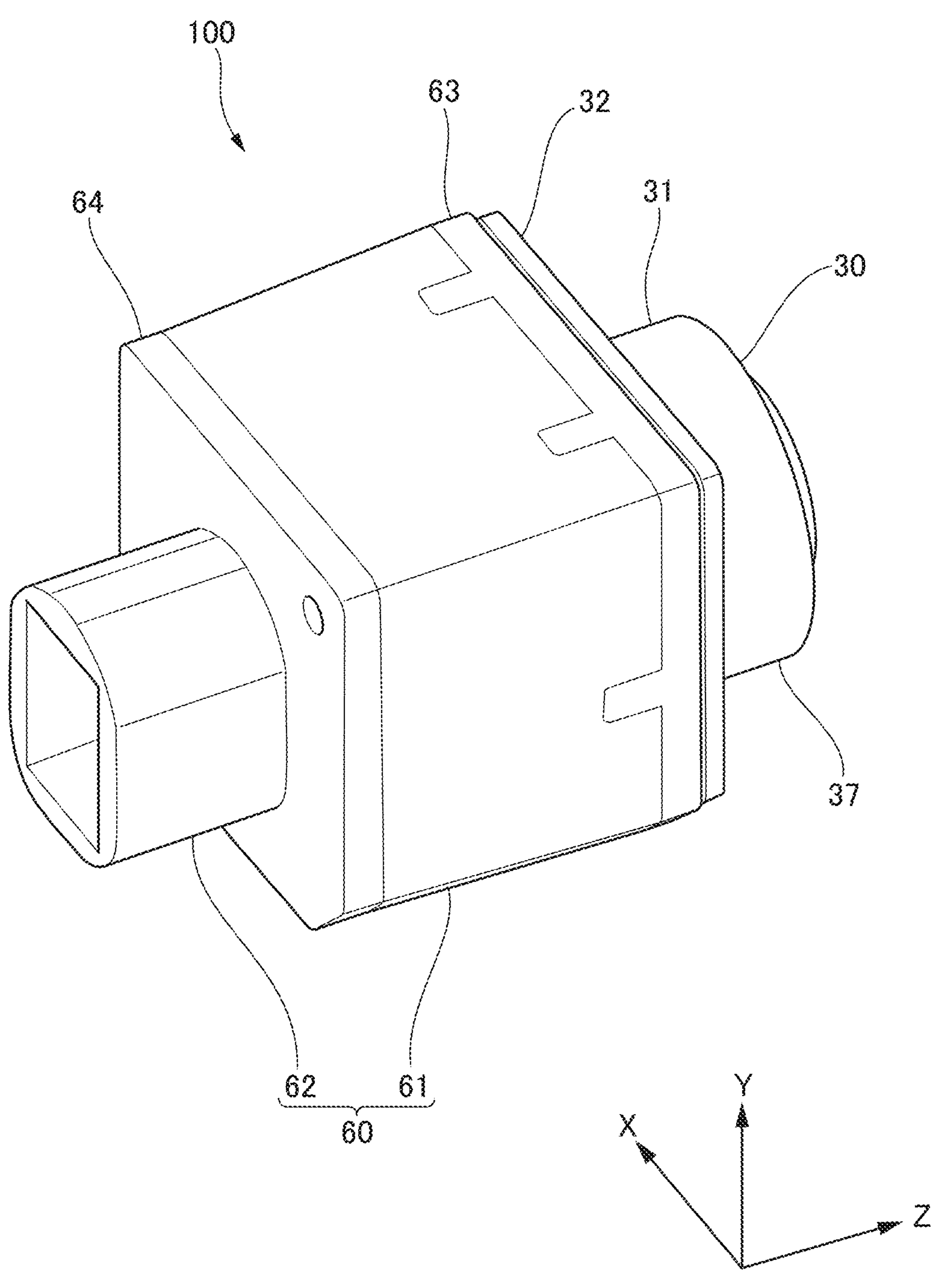
FIG. 7 is a rear perspective view of the vehicular camera according to the embodiment.
Figure 8:
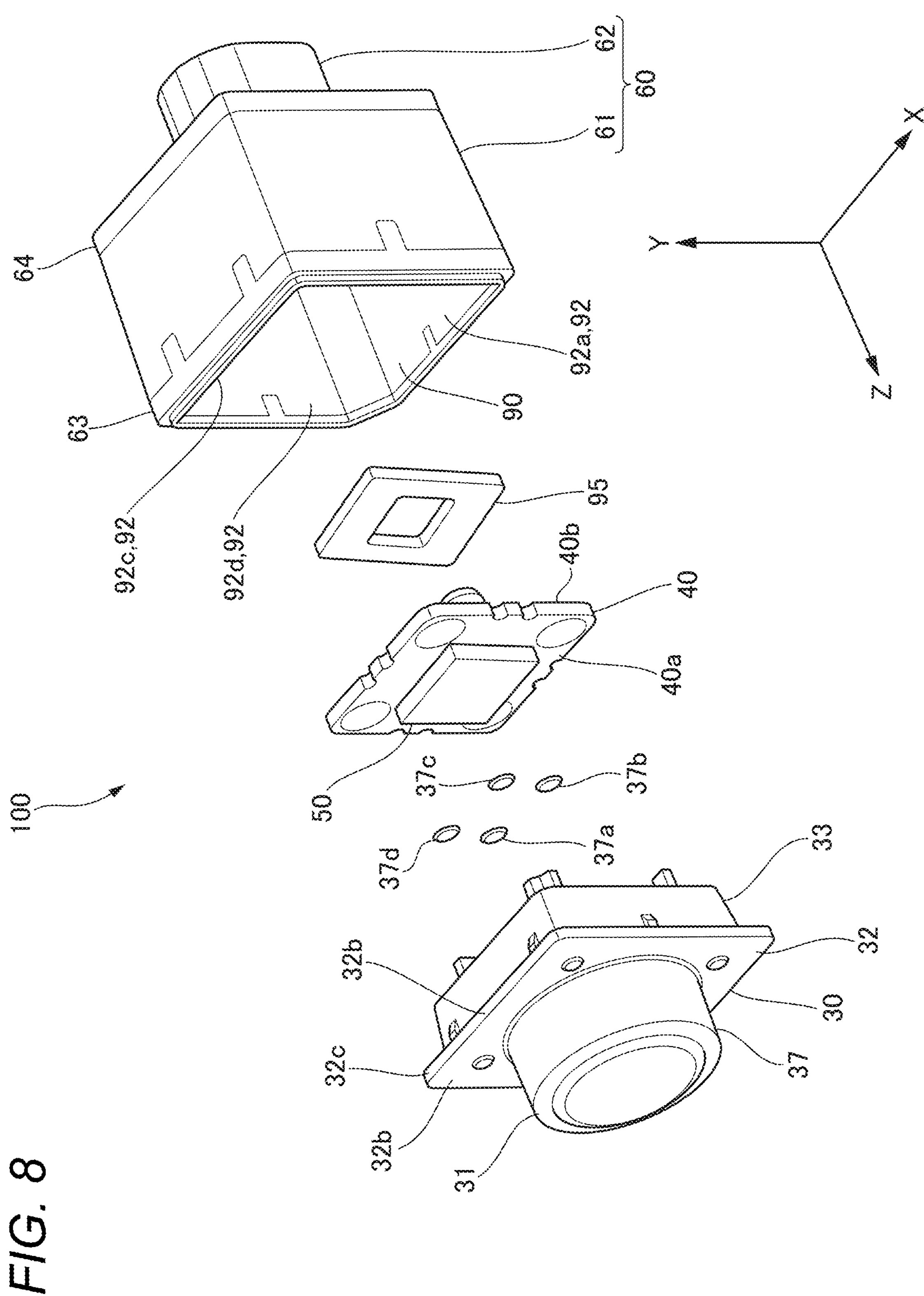
FIG. 8 is an exploded perspective view of the vehicular camera according to the embodiment.
Figure 9:
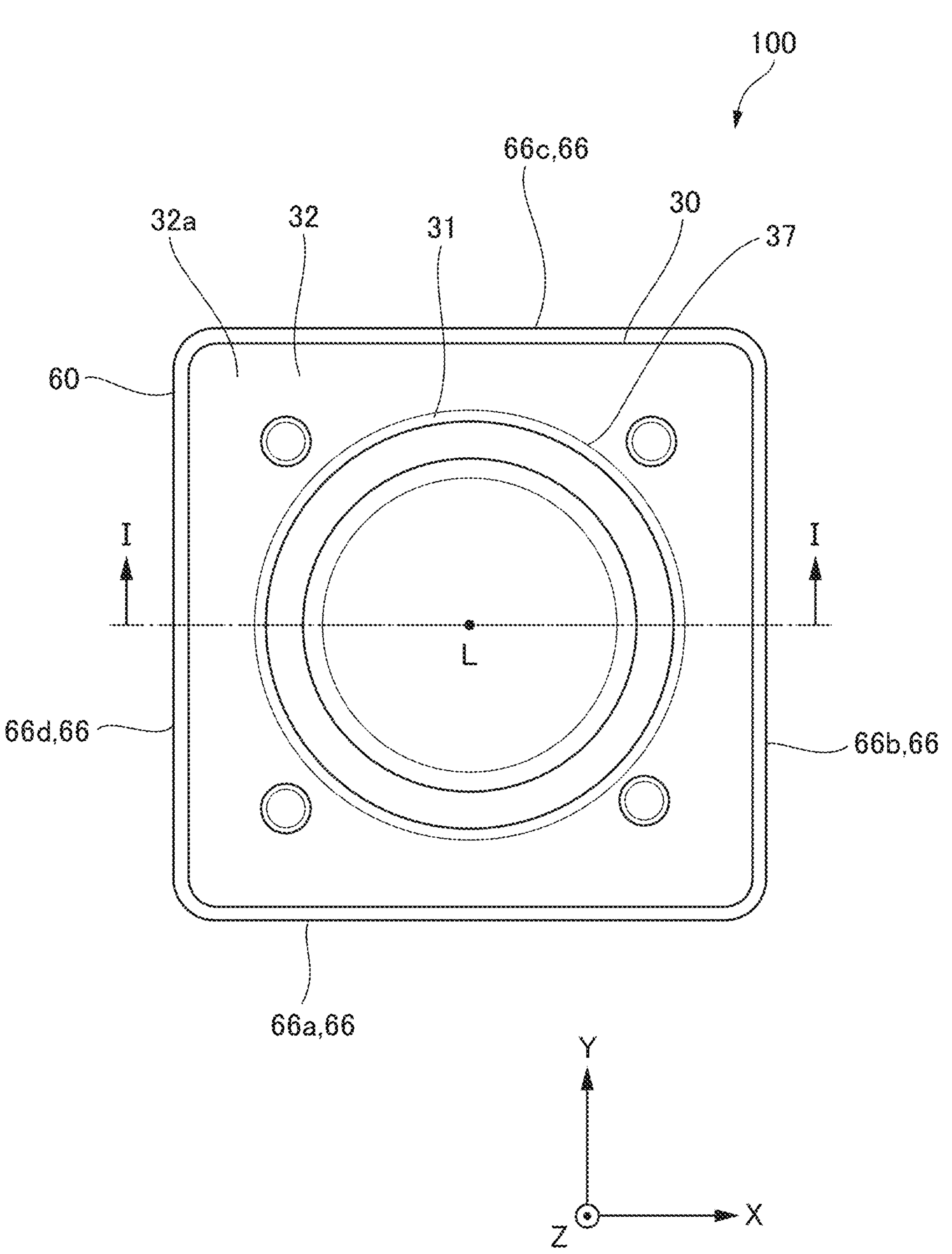
FIG. 9 is a top view of the vehicular camera according to the embodiment.
Figure 10:
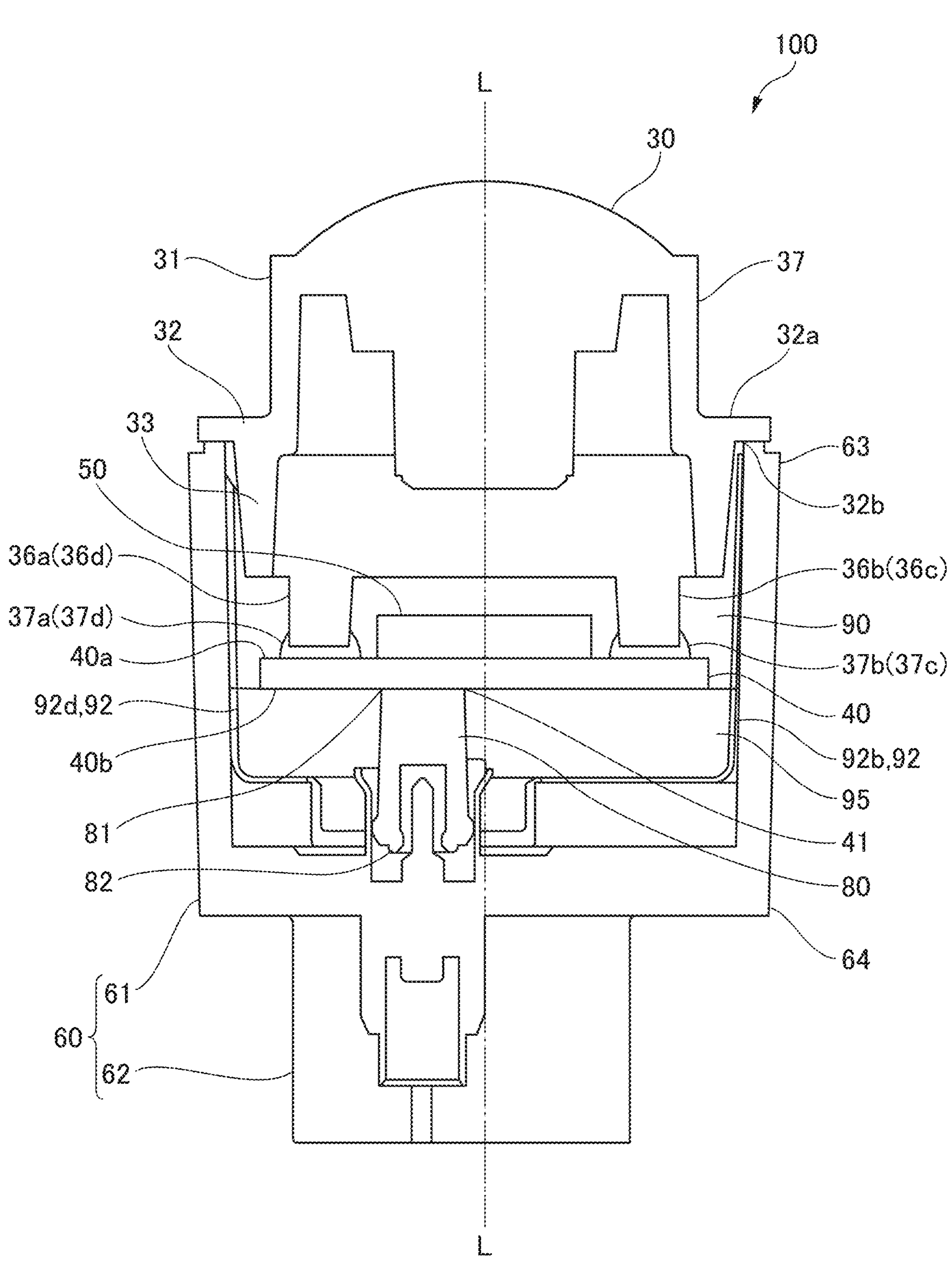
FIG. 10 is a cross-sectional view taken along a line I-I in FIG. 9.

FIG. 6 is a front perspective view of the vehicular camera 100 according to an embodiment. FIG. 7 is a rear perspective view of the vehicular camera 100 according to the embodiment. FIG. 8 is an exploded perspective view of the vehicular camera 100 according to the embodiment. FIG. 9 is a top view of the vehicular camera according to the embodiment. FIG. 10 is a cross-sectional view taken along a line I-I in FIG. 9. Coordinates including an X axis along one side of the vehicular camera 100, a Y axis orthogonal to the X axis and along another side of the vehicular camera 100, and a Z axis orthogonal to the X axis and the Y axis and along a height direction of the vehicular camera 100 are defined, and are used in the following description.

The vehicular camera 100 according to the present embodiment includes a lens unit 30, a circuit board 40, an imaging element 50, and a housing 60.

The lens unit 30 includes a first tubular portion 37 that constitutes a lens barrel 31 having a tubular shape and has a first tubular shape, and at least one lens disposed inside the first tubular portion 37 and on an optical axis L (see FIG. 10). The first tubular portion 37 has a tubular shape, and holds therein, for example, a lens group including a plurality of lenses. The respective lenses in the lens group are arranged in a state in which respective optical axes L are aligned with each other, and constitute the lens group used for capturing images of the inside and outside of the vehicle body of the vehicle V.

Further, the lens unit 30 has a flange portion 32 disposed outside the first tubular portion 37 to extend outward with reference to the optical axis L over an entire circumference centering on the optical axis L.

The flange portion 32 has a first flange surface 32*a*, a second flange surface 32*b* opposite to the first flange surface 32*a* and located in an internal space of a large-diameter tubular portion 61 of the housing 60 to be described later, and a flange end surface 32*c* connecting the first flange surface 32*a* and the second flange surface 32*b*.

The first tubular portion 37 and the flange portion 32 of the lens unit 30 are integrally formed of a first resin.

The circuit board 40 is disposed in the internal space of the housing 60, and includes a first surface 40*a* and a second surface 40*b* opposite to the first surface 40*a*. However, two or more circuit boards may be provided.

The flange portion 32 of the lens unit 30 and the circuit board 40 are disposed to be substantially parallel to each other. That is, the first flange surface 32*a* of the flange portion 32 is disposed along the first surface 40*a* of the circuit board 40. The second flange surface 32*b* is also disposed along the first surface 40*a* of the circuit board 40, and is located closer to the first surface 40*a* of the circuit board 40 than the first flange surface 32*a* in a direction of the optical axis L with reference to the first surface 40*a* of the circuit board 40.

The imaging element 50 is disposed on the first surface 40*a* of the circuit board 40 and on the optical axis L of at least one lens of the lens units 30. By guiding light from the outside to the imaging element 50, the imaging element 50 can capture an image.

The imaging element 50 has predetermined sensitivity to the light guided from the outside via the lens unit 30, and can capture an image according to the sensitivity. Generally, the sensitivity of the imaging element varies depending on a wavelength of received light. The imaging element 50 in the embodiment has at least first sensitivity in a first wavelength band having a wavelength shorter than a predetermined wavelength and second sensitivity smaller than the first sensitivity in a second wavelength band having a wavelength longer than the predetermined wavelength.

The housing 60 is a tubular member having the internal space, and supports the lens unit 30 and accommodates at least the circuit board 40 and the imaging element 50. The housing 60 has the large-diameter tubular portion 61 having a second tubular shape along the optical axis L, and a small-diameter tubular portion 62 along the optical axis L. In a plane direction perpendicular to the optical axis L, the large-diameter tubular portion 61 constituting a second tubular portion has a larger cross-sectional area than the small-diameter tubular portion 62, and has a rectangular cross section. The large-diameter tubular portion 61 accommodates at least the circuit board 40 and the imaging element 50 therein. The small-diameter tubular portion 62 mainly accommodates an electrical connector 80 that secures electrical connection with the outside of the vehicular camera 100. The large-diameter tubular portion 61 and the small-diameter tubular portion 62 may be integrally formed of a resin to be described later, and the large-diameter tubular portion 61 and the small-diameter tubular portion 62 prepared individually in advance may be joined by a method such as welding or screwing. In the present embodiment, the housing 60 has a rectangular tubular shape, but is not limited thereto, and may have a polygonal tubular shape other than the rectangular tubular shape, a circular or elliptical tubular shape, or another tubular shape.

The large-diameter tubular portion 61 has a first end 63 and a second end 64 that is opposite to the first end 63 and disposed at a position farther from the first end 63 with reference to the lens unit 30 in the direction of the optical axis L.

At least the large-diameter tubular portion 61 of the housing 60 is formed of a second resin, and the first end 63 of the second tubular portion 61 is welded to the flange portion 32 of the lens unit 30 over the entire circumference centering on the optical axis L. The first end 63 and the flange portion 32 are welded by, for example, laser welding using laser light.

General laser welding is used for welding, for example, the first resin having predetermined light transmittance and the second resin having light transmittance (which may be light absorptivity) lower than the light transmittance of the first resin at a wavelength of laser light. When the first resin is irradiated with the laser light in a state in which pressure is applied to both the resins, the laser light is not absorbed and passes through the first resin. The transmitted laser light is absorbed by a surface of the second resin having light transmittance lower than that of the first resin. The energy of the absorbed laser is converted into heat, and the surface of the second resin is heated. Further, a surface of the first resin in contact with the surface of the second resin is also heated due to heat conduction. Accordingly, the first resin and the second resin are melted at a boundary surface therebetween. When the laser emission is stopped, the melted resin is solidified and both resins are welded.

In the present embodiment, the first tubular portion 37 and the flange portion 32 of the lens unit 30 are integrally formed of the first resin, and the housing 60 is formed of the second resin. In the laser welding, the laser light is emitted from above the flange portion 32 in a state in which the lens unit 30 is in close contact with the housing 60. As in the general method described above, the light transmittance of the first resin is larger than the light transmittance of the second resin at least at the wavelength of the laser light used. Thus, the laser light that has passed through the flange portion 32 formed of the first resin is absorbed by the first end 63 of the housing 60 formed of the second resin, and the laser welding is performed.

As in the present embodiment, by integrally forming the first tubular portion 37 and the flange portion 32 of the lens unit 30 with the first resin, the number of components and manufacturing processes can be reduced. However, the fact that the laser light used for the welding passes through the flange portion 32 and reaches the first end 63 of the housing 60 also means that the laser light reaches an interior of the housing 60, that is, the imaging element 50. If sensitivity of the imaging element 50 is high with respect to the wavelength of the laser light that can pass through the first resin (the flange portion 32), light having a wavelength that affects imaging reaches the imaging element 50 from the outside through the first resin even after the vehicular camera 100 is completed. Such an event may have a bad influence on the imaging element 50.

Therefore, in the present embodiment, the first resin for forming the first tubular portion 37 and the flange portion 32 has first light transmittance in the first wavelength band of the imaging element 50, and has second light transmittance larger than the first light transmittance in the second wavelength band of the imaging element 50. That is, the first resin has a property of more easily transmitting light in the second wavelength band having a longer wavelength than light in the first wavelength band having a shorter wavelength.

Since the first resin easily transmits the light in the second wavelength band having a longer wavelength, the laser welding can be performed by laser light in the second wavelength band. On the other hand, the first resin is less likely to transmit or does not transmit the light in the first wavelength band having a shorter wavelength than the light in the second wavelength band. The imaging element 50 has the first sensitivity higher in the first wavelength band having a shorter wavelength. Thus, even after the vehicular camera 100 is completed, the first resin (the flange portion 32) is less likely to transmit or does not transmit the light in the first wavelength band which may have a bad influence on the imaging element 50.

In addition, the second resin of the housing 60 has third light transmittance smaller than the second light transmittance of the first resin at least in the second wavelength band of the imaging element 50. Accordingly, since the second resin absorbs the laser light transmitted through the first resin in the laser welding, the laser welding can be performed.

That is, while the first resin has the second light transmittance higher in the second wavelength band, the imaging element 50 has the first sensitivity higher in the first wavelength band having a shorter wavelength than the second wavelength band. Thus, in the welding of the lens unit 30 and the housing 60, by using the laser light in the second wavelength band that passes through the first resin, the welding can be smoothly performed. In addition, since the first resin prevents light to which the imaging element 50 is highly sensitive from entering the interior of the housing 60 from the flange portion 32, it is possible to reduce the influence on the imaging element.

Figure 11:
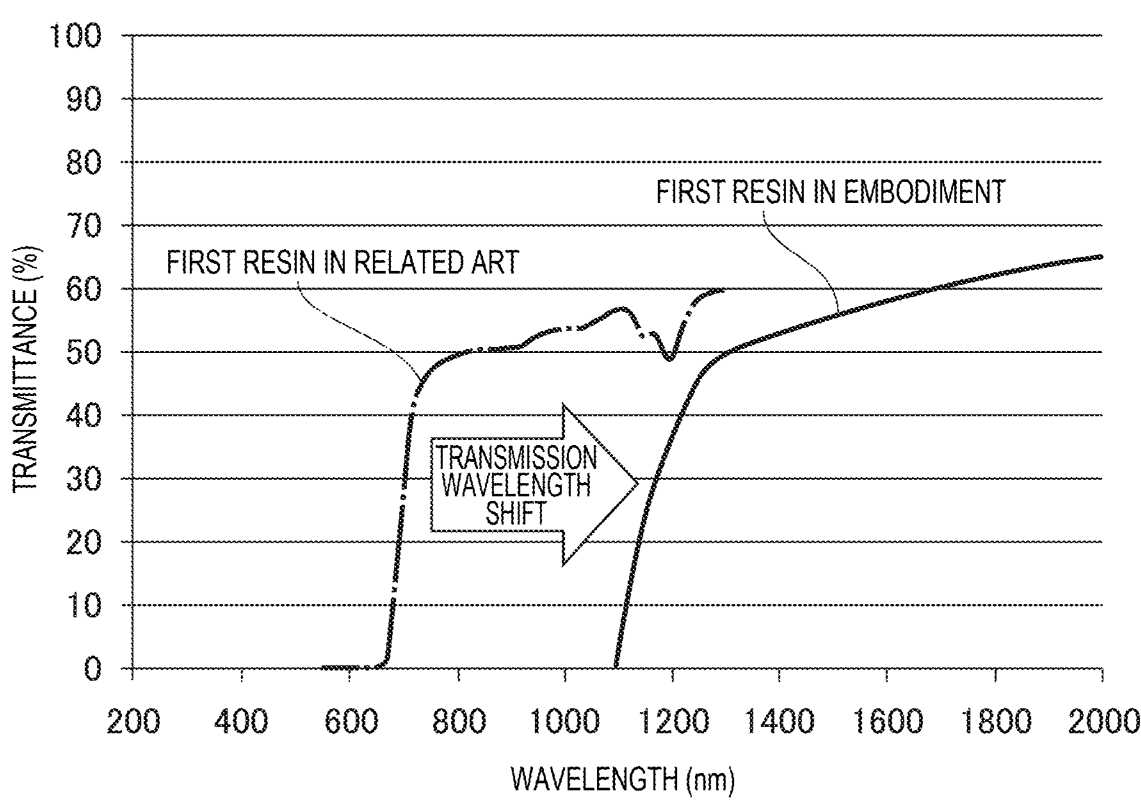
FIG. 11 is a graph showing transmittance of a first resin in related art and transmittance of a first resin in the embodiment relative to a wavelength on a horizontal axis.

FIG. 11 is a graph showing transmittance (%) of the first resin in related art and transmittance (%) of the first resin in the embodiment with respect to a wavelength (nm) on a horizontal axis. As illustrated, the first resin in the related art has a rising wavelength where the transmittance increases at a wavelength of about 700 nm as the wavelength increases from 0 nm. On the other hand, in general, the imaging element 50 has a property that the sensitivity decreases at a boundary (a boundary between the first wavelength band and the second wavelength band) of 1000 nm to 1200 nm as the predetermined wavelength as the wavelength increases from 0 nm. That is, the rising wavelength of the first resin in the related art overlaps a wavelength band in which the sensitivity of the imaging element 50 is high, that is, the first wavelength band. Thus, the flange portion 32 formed of the first resin in the related art transmits the light to which the imaging element 50 is highly sensitive, and may have a bad influence on the imaging element 50.

On the other hand, as illustrated, the first resin in the embodiment has a rising wavelength where the transmittance increases at a wavelength of about 1100 nm as the wavelength increases from 0 nm, and the rising wavelength is shifted to a longer wavelength side (transmission wavelength shift) as compared with the first resin in the related art. That is, the rising wavelength of the first resin in the embodiment is a wavelength higher than the wavelength band in which the sensitivity of the imaging element 50 is high, that is, the first wavelength band, and does not overlap the first wavelength band in which the sensitivity of the imaging element 50 is high. Since the first resin transmits the light in the second wavelength band in which the sensitivity of the imaging element 50 is low, the laser welding is possible. Thus, since the flange portion 32 formed of the first resin in the embodiment is less likely to transmit or does not transmit the light to which the imaging element 50 is highly sensitive, it is possible to prevent a bad influence on the imaging element 50.

The second resin of the housing 60 may have fourth light transmittance smaller than the second light transmittance not only in the second wavelength band but also in the first wavelength band. Accordingly, it is possible to prevent transmission of unnecessary light through the housing 60 and to further reduce the influence on the imaging element 50.

In the embodiment, the first end 63 of the large-diameter tubular portion 61 of the housing 60 is welded to the flange portion 32 of the lens unit 30 by the laser light over the entire circumference centering on the optical axis L. Accordingly, the lens unit 30 can be firmly welded to the housing 60.

The predetermined wavelength of the imaging element 50 may be one wavelength within a range of 1000 nm to 1200 nm. Accordingly, it is possible to prevent visible light having a large influence on the imaging element 50 from passing through the first resin and the second resin, and to reduce the influence on the imaging element 50. The laser light used for the laser welding may have a wavelength longer than the one wavelength. Accordingly, the laser light can pass through the first resin reliably, and the welding can be reliably performed. The predetermined wavelength may be, for example, 1100 nm. In this case, the first wavelength band is a wavelength band having a wavelength of 0 nm or more and shorter than 1100 nm, and the second wavelength band is a wavelength band having a wavelength longer than 1100 nm.

As described above, the flange portion 30 of the lens unit 30 has the first flange surface 32*a* and the second flange surface 32*b*. In the embodiment, the first end 63 of the large-diameter tubular portion 61 of the housing 60 is welded to the second flange surface 32*b* of the flange portion 32 of the lens unit 30 over the entire circumference centering on the optical axis L. Accordingly, the flange portion 32 of the lens unit 30 can be firmly welded to the housing 60.

Figure 12:
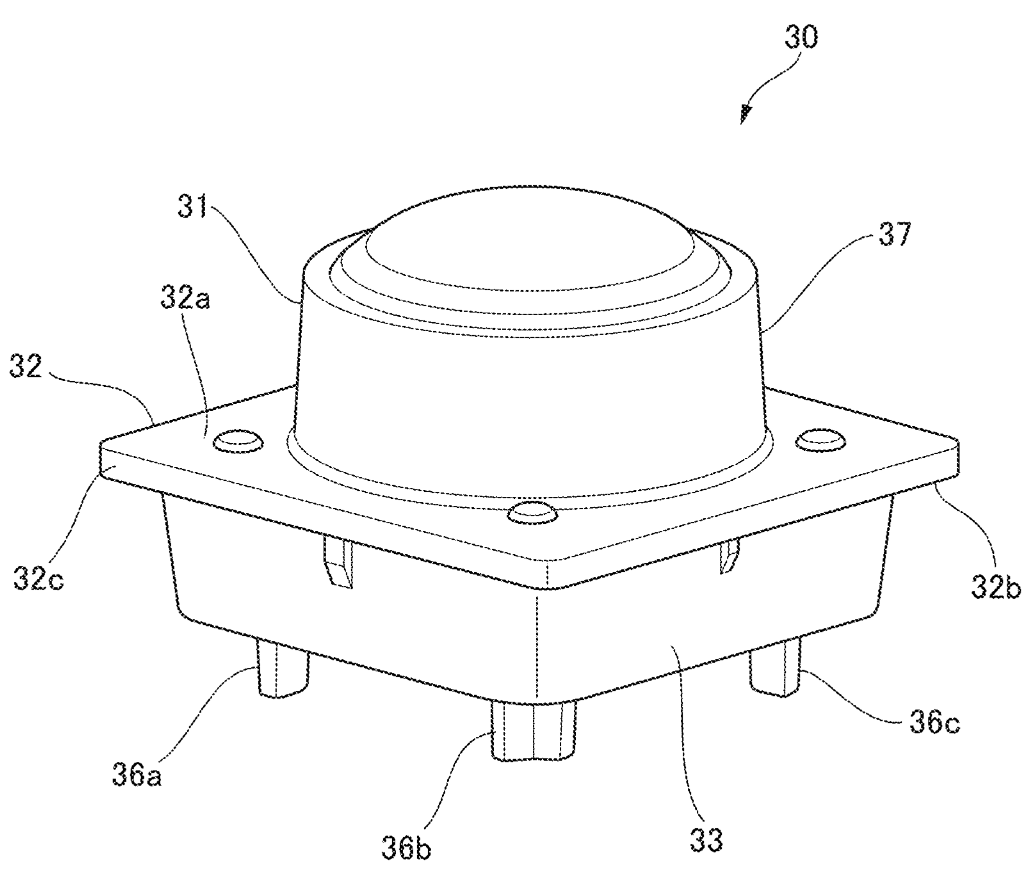
FIG. 12 is a perspective view of a lens unit.
Figure 12:
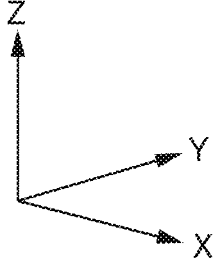
Figure 13:
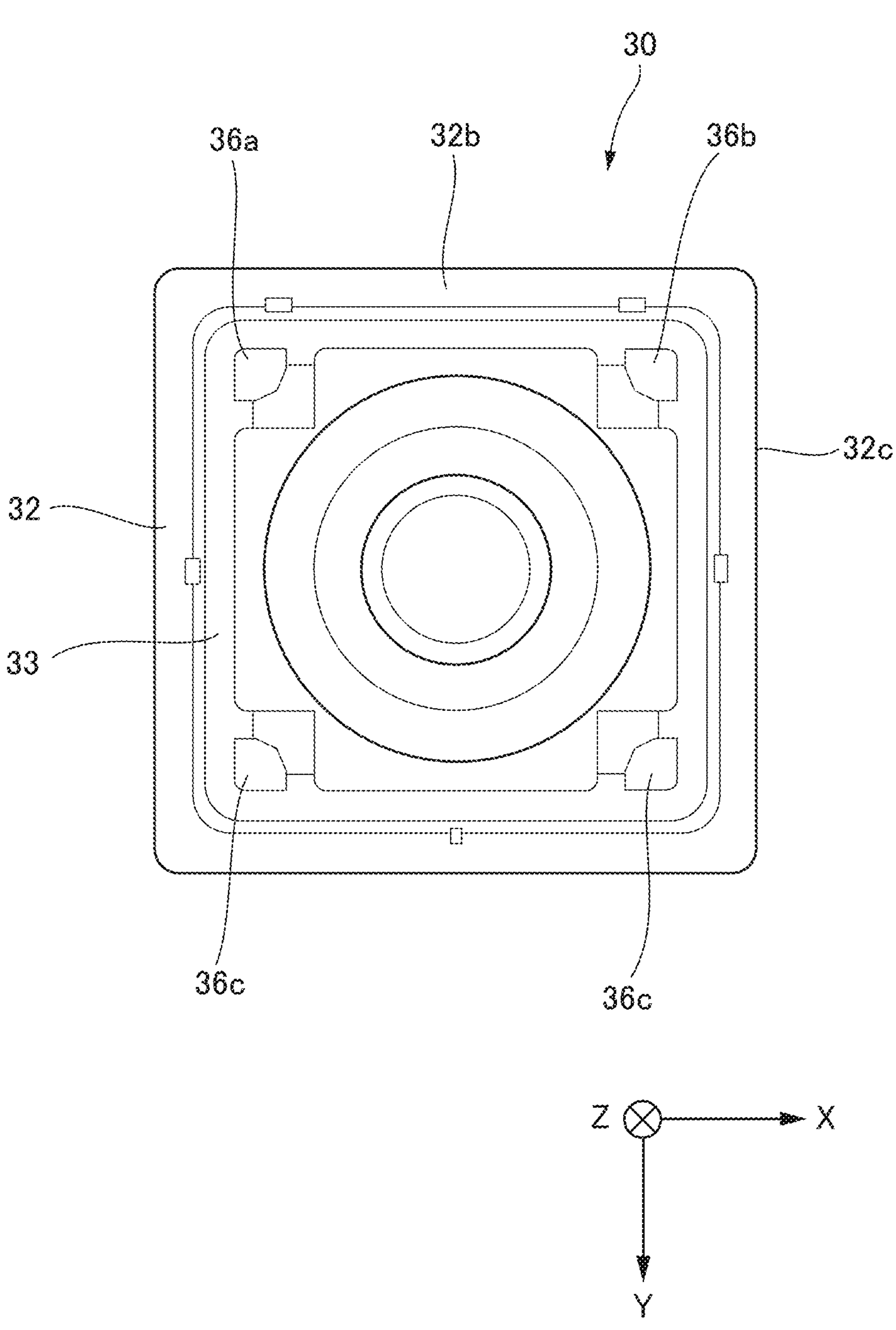
FIG. 13 is a bottom view of the lens unit.

FIG. 12 is a perspective view of the lens unit 30. FIG. 13 is a bottom view of the lens unit 30. The lens unit 30 further includes a flange protruding portion 33 protruding from the second flange surface 32*b* of the flange portion 32 toward the second end 64 of the large-diameter tubular portion 61 of the housing 60 in the direction of the optical axis L, and at least three protrusions 36 protruding from the flange protruding portion 33 toward the first surface 40*a* of the circuit board 40 in the direction of the optical axis L.

At least three protrusions 36 include a first protrusion 36*a*, a second protrusion 36*b*, and a third protrusion 36*c*. The large-diameter tubular portion 61 of the lens unit 30, the flange portion 32, the flange protruding portion 33 of the flange portion 32, and at least three protrusions 36 of the flange protruding portion 33 are integrally formed of the first resin. In FIG. 10, the third protrusion 36*c* is present on a rear side of the second protrusion 36*b* in the Y axis, and is not directly illustrated.

Accordingly, the number of components and manufacturing processes can be reduced by integrally forming the lens unit 30 having a complicated shape.

The first protrusion 36*a* and the first surface 40*a* of the circuit board 40 are bonded with a first adhesive 37*a*, the second protrusion 36*b* and the first surface 40*a* of the circuit board 40 are bonded with a second adhesive 37*b*, and the third protrusion 36*c* and the first surface 40*a* of the circuit board 40 are bonded with a third adhesive 37*c*. In FIG. 10, the third adhesive 37*c* is present on a rear side of the second adhesive 37*b* in the Y axis, and is not directly illustrated. The first adhesive 37*a*, the second adhesive 37*b*, and the third adhesive 37*c* may be the same adhesive or different adhesives.

Accordingly, since the flange portion 32 is supported not only by the housing 60 but also by the circuit board 40 via at least three protrusions 36, the lens unit 30 can be more stably disposed. In the embodiment, in FIG. 10, a fourth protrusion 36*d* and a fourth adhesive 37*d* are present on rear sides of the first protrusion 36*a* and the first adhesive 37*a* in the Y-axis direction, respectively, and the flange portion 32 is supported by the circuit board 40 via the four protrusions.

The housing 60 includes four side walls 66 that are formed continuously with the second end 64 of the housing 60 and extend from the second end 64 toward the second flange surface 32*b* of the lens unit 30. The four side walls 66 are a first side wall 66*a*, a second side wall 66*b*, a third side wall 66*c*, and a fourth side wall 66*d*. The first side wall 66*a* is connected to the second side wall 66*b*, the second side wall 66*b* is connected to the third side wall 66*c*, the third side wall 66*c* is connected to the fourth side wall 66*d*, and the fourth side wall 66*d* is connected to the first side wall 66*a*. Accordingly, it is possible to form the housing 60 in a simple shape.

The vehicular camera 100 further includes the electrical connector 80 including a first connector end 81 and a second connector end 82 opposite to the first connector end 81, and a connector connection portion 41 disposed on the second surface 40*b* of the circuit board 40. The electrical connector 80 is disposed inside the large-diameter tubular portion 61 of the housing 60.

The first connector end 81 of the electrical connector 80 is electrically connected to the connector connection portion 41 on the second surface 40*b* of the circuit board 40, and the second connector end 82 of the electrical connector 80 is electrically connected to a cable of the vehicle V when the vehicular camera 100 is disposed in the vehicle V.

Accordingly, the circuit board 40 and the cable of the vehicle V can be electrically connected with a simple configuration using the electrical connector 80.

The first tubular portion 37 of the lens unit 30 has a circular shape in a plan view (a plan view when viewed from the direction of the optical axis L, the same applies hereinafter) of first tubular portion 37. The flange portion 32 of the lens unit 30 has a first rectangle in a plan view of the flange portion 32. The flange protruding portion 33 of the lens unit 30 has a second rectangle having a smaller area than the first rectangle of the flange portion 32 in a plan view of the flange protruding portion 33. The large-diameter tubular portion 61 of the housing 60 has a third rectangle having a larger area than the second rectangle of the flange protruding portion 33 in a plan view of the large-diameter tubular portion 61.

Accordingly, it is possible to manufacture the lens unit 30 and the housing 60 in a simple shape.

The vehicular camera 100 also includes a metal shield member 90 having a third tubular shape. The shield member 90 has a shielding function of protecting the imaging element 50 from external noise. As shown in FIGS. 8 and 10, the shield member 90 includes a bottom surface 91 and four side surfaces 92 extending from the bottom surface 91 toward the second flange surface 32*b* of the flange portion 32 of the lens unit 30 in the direction of the optical axis L. The four side surfaces 92 of the shield member 90 are a first side surface 92*a*, a second side surface 92*b* connected to the first side surface 92*a*, a third side surface 92*c* connected to the second side surface 92*b*, and a fourth side surface 92*d* connected to the third side surface 92*c*.

Accordingly, the shield member 90 can be formed in a simple shape.

The vehicular camera 100 further includes a heat-conducting member 95 disposed inside the third tubular portion of the shield member 90. Accordingly, the heat from the imaging element 50 and the circuit board 40, which are likely to generate heat, can be efficiently dissipated to the shield member 90 and the housing 60 through the heat-conducting member 95. The heat-conducting member 95 may be made of, for example, silicone resin. The heat-conducting member 95 shown in the exploded perspective view of FIG. 8 shows a shape before manufacturing the vehicular camera 100, and the heat-conducting member 95 is disposed between the second surface 40*b* of the circuit board 40 and the second end 64 of the housing 60 after manufacturing by applying heat during manufacturing.

From the above, at least the following matters are described in the present disclosure. Components corresponding to those in the embodiment are shown in parentheses, but the present disclosure is not limited thereto.

(1) A vehicular camera (vehicular camera 100) including:

a lens unit (lens unit 30) including a first tubular portion (first tubular portion 37) having a first tubular shape, at least one lens disposed inside the first tubular portion and on an optical axis (optical axis L), and a flange portion (flange portion 32) disposed outside the first tubular portion to extend outward with reference to the optical axis over an entire circumference centering on the optical axis;

a circuit board (circuit board 40) including a first surface (first surface 40*a*) and a second surface (second surface 40*b*) opposite to the first surface;

an imaging element (imaging element 50) disposed on the optical axis and on the first surface of the circuit board;

a housing (housing 60) configured to accommodate at least the circuit board and the imaging element and including a second tubular portion (large-diameter tubular portion 61) having a second tubular shape along the optical axis, in which the second tubular portion of the housing includes a first end (first end 63), and a second end (second end 64) that is opposite to the first end and is disposed at a position farther than the first end with reference to the lens unit in a direction of the optical axis, the first tubular portion and the flange portion of the lens unit are integrally formed of a first resin, the housing is formed of a second resin, the first end of the second tubular portion of the housing is welded to the flange portion of the lens unit over the entire circumference centering on the optical axis, the imaging element has first sensitivity in a first wavelength band having a wavelength shorter than a predetermined wavelength, and second sensitivity smaller than the first sensitivity in a second wavelength band having a wavelength longer than the predetermined wavelength, the first resin of the first tubular portion and the flange portion has first light transmittance in the first wavelength band and second light transmittance larger than the first light transmittance in the second wavelength band, and the second resin of the housing has a third light transmittance smaller than the second light transmittance at least in the second wavelength band.

In the vehicular camera of the present disclosure, since the first tubular portion and the flange portion of the lens unit are integrally formed of the first resin, the number of components and manufacturing processes can be reduced. In addition, while the first resin has the second light transmittance higher in the second wavelength band, the imaging element has the first sensitivity higher in the first wavelength band having a shorter wavelength than the second wavelength band. Thus, in the welding of the lens unit and the housing, by using the laser light in the second wavelength band that passes through the first resin, the welding can be smoothly performed. In addition, since the first resin prevents light to which the imaging element is highly sensitive from entering the interior of the housing from the flange portion, it is possible to reduce the influence on the imaging element.

(2) The vehicular camera according to (1), in which the second resin of the housing has fourth light transmittance smaller than the second light transmittance also in the first wavelength band.

Accordingly, it is possible to prevent transmission of unnecessary light through the housing and to further reduce the influence on the imaging element.

(3) The vehicular camera according to (1), in which the first end of the second tubular portion of the housing is welded to the flange portion of the lens unit by laser light over the entire circumference centering on the optical axis.

Accordingly, the lens unit can be firmly welded to the housing.

(4) The vehicular camera according to (3), in which the predetermined wavelength is one wavelength within a range of 1000 nm to 1200 nm.

Accordingly, it is possible to prevent visible light having a large influence on the imaging element from passing through the first resin and the second resin, and to reduce the influence on the imaging element.

(5) The vehicular camera according to (4), in which the laser light has a wavelength longer than the one wavelength.

Accordingly, the laser light can pass through the first resin reliably, and the welding can be reliably performed.

(6) The vehicular camera according to (1), in which the flange portion of the lens unit includes a first flange surface disposed along the first surface of the circuit board, and a second flange surface disposed along the first surface of the circuit board and located closer to the first surface of the circuit board than the first flange surface in the direction of the optical axis, and the first end of the second tubular portion of the housing is welded to the second flange surface of the flange portion of the lens unit over the entire circumference centering on the optical axis.

Accordingly, the flange portion of the lens unit can be firmly welded to the housing.

(7) The vehicular camera according to (6), in which the lens unit includes a flange protruding portion (flange protruding portion 33) protruding from the second flange surface of the flange portion toward the second end of the second tubular portion of the housing in the direction of the optical axis, and at least three protrusions (protrusions 36) protruding from the flange protruding portion toward the first surface of the circuit board in the direction of the optical axis, the at least three protrusions include a first protrusion (first protrusion 36*a*), a second protrusion (second protrusion 36*b*), and a third protrusion (third protrusion 36*c*), and the first tubular portion of the lens unit, the flange portion of the lens unit, the flange protruding portion of the flange portion, and the at least three protrusions of the flange protruding portion are integrally formed of the first resin.

Accordingly, the number of components and manufacturing processes can be reduced by integrally forming the lens unit having a complicated shape.

(8) The vehicular camera according to (7), in which the first protrusion of the flange protruding portion of the flange portion of the lens unit is bonded to the first surface of the circuit board with a first adhesive (first adhesive 37*a*), the second protrusion of the flange protruding portion of the flange portion of the lens unit is bonded to the first surface of the circuit board with a second adhesive (second adhesive 37*b*), and the third protrusion of the flange protruding portion of the flange portion of the lens unit is bonded to the first surface of the circuit board with a third adhesive (third adhesive 37*c*).

Accordingly, since the flange portion is supported not only by the housing but also by the circuit board via at least three protrusions, the lens unit can be more stably disposed.

(9) The vehicular camera according to (8), in which the housing includes four side walls (side wall 66) that are formed continuously with the second end of the housing and extend from the second end toward the second flange surface of the lens unit, the four side walls are a first side wall (first side wall 66*a*), a second side wall (second side wall 66*b*), a third side wall (third side wall 66*c*), and a fourth side wall (fourth side wall 66*d*), the first side wall of the housing is connected to the second side wall of the housing, the second side wall of the housing is connected to the third side wall of the housing, the third side wall of the housing is connected to the fourth side wall of the housing, and the fourth side wall of the housing is connected to the first side wall of the housing.

Accordingly, it is possible to form the housing in a simple shape.

(10) The vehicular camera according to (9), further including:

an electrical connector (electrical connector 80) including a first connector end (first connector end 81) and a second connector end (second connector end 82) opposite to the first connector end, and a connector connection portion (connector connection portion 41) disposed on the second surface of the circuit board, in which the electrical connector is disposed inside the second tubular portion of the housing, the first connector end of the electrical connector is electrically connected to the connector connection portion on the second surface of the circuit board, and the second connector end of the electrical connector is electrically connected to a cable of the vehicle when the vehicular camera is disposed in the vehicle.

Accordingly, the circuit board and the cable of the vehicle can be electrically connected with a simple configuration using the electrical connector.

(11) The vehicular camera according to (10), in which the first tubular portion of the lens unit has a circular shape in a plan view of the first tubular portion, the flange portion of the lens unit has a first rectangle in a plan view of the flange portion, the flange protruding portion of the lens unit has a second rectangle having a smaller area than the first rectangle of the flange portion in a plan view of the flange protruding portion, and the second tubular portion of the housing has a third rectangle having a larger area than the second rectangle of the flange protruding portion in a plan view of the second tubular portion.

Accordingly, it is possible to manufacture the lens unit and the housing in a simple shape.

(12) The vehicular camera according to (11), further including:

a metal shield member (shield member 90) having a third tubular shape, in which the shield member includes a bottom surface (bottom surface 91), and four side surfaces (side surface 92) extending from the bottom surface toward the second flange surface of the flange portion of the lens unit in the direction of the optical axis, and the four side surfaces of the shield member are a first side surface (first side surface 92*a*), a second side surface (second side surface 92*b*) connected to the first side surface, a third side surface (third side surface 92*c*) connected to the second side surface, and a fourth side surface (fourth side surface 92*d*) connected to the third side surface.

Accordingly, the shield member can be formed in a simple shape.

(13) The vehicular camera according to (12), further including:

a heat-conducting member (heat-conducting member 95) disposed inside the third tubular portion of the shield member.

Accordingly, the heat generated from the circuit board or the like can be easily dissipated through the heat-conducting member.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiment described above may be freely combined without departing from the gist of the invention.

INDUSTRIAL APPLICABILITY

The present disclosure is useful as a vehicular camera in which the lens unit and the housing are smoothly welded and the light to which the imaging element is highly sensitive is prevented from entering the interior of the housing from the flange portion, thereby reducing the influence on the imaging element.

CROSS-REFERENCE TO RELATED APPLICATIONS

This application is based on and claims priority under 35 USC 119 from Japanese Patent Application No. 2023-

185816 filed on Oct. 30, 2023, the entire content of which is incorporated herein by reference.

What is claimed is:

1. A vehicular camera comprising:

a lens unit including a first tubular portion having a first tubular shape, at least one lens disposed inside the first tubular portion and on an optical axis, and a flange portion disposed outside the first tubular portion to extend outward with reference to the optical axis over an entire circumference centering on the optical axis;

a circuit board including a first surface and a second surface opposite to the first surface;

an imaging element disposed on the optical axis and on the first surface of the circuit board; and a housing configured to accommodate at least the circuit board and the imaging element and including a second tubular portion having a second tubular shape along the optical axis, wherein the second tubular portion of the housing includes a first end, and a second end that is opposite to the first end and is disposed at a position farther than the first end with reference to the lens unit in a direction of the optical axis, the first tubular portion and the flange portion of the lens unit are integrally formed of a first resin, the housing is formed of a second resin, the first end of the second tubular portion of the housing is welded to the flange portion of the lens unit over the entire circumference centering on the optical axis, the imaging element has first sensitivity in a first wavelength band having a wavelength shorter than a predetermined wavelength, and second sensitivity smaller than the first sensitivity in a second wavelength band having a wavelength longer than the predetermined wavelength, the first resin of the first tubular portion and the flange portion has first light transmittance in the first wavelength band and second light transmittance larger than the first light transmittance in the second wavelength band, and the second resin of the housing has a third light transmittance smaller than the second light transmittance at least in the second wavelength band.

2. The vehicular camera according to claim 1, wherein the second resin of the housing has fourth light transmittance smaller than the second light transmittance also in the first wavelength band.

3. The vehicular camera according to claim 1, wherein the first end of the second tubular portion of the housing is welded to the flange portion of the lens unit by laser light over the entire circumference centering on the optical axis.

4. The vehicular camera according to claim 3, wherein the predetermined wavelength is one wavelength within a range of 1000 nm to 1200 nm.

5. The vehicular camera according to claim 4, wherein the laser light has a wavelength longer than the one wavelength.

6. The vehicular camera according to claim 1, wherein the flange portion of the lens unit includes a first flange surface disposed along the first surface of the circuit board, and a second flange surface disposed along the first surface of the circuit board and located closer to the first surface of the circuit board than the first flange surface in the direction of the optical axis, and the first end of the second tubular portion of the housing is welded to the second flange surface of the flange portion of the lens unit over the entire circumference centering on the optical axis.

7. The vehicular camera according to claim 6, wherein the lens unit includes a flange protruding portion protruding from the second flange surface of the flange portion toward the second end of the second tubular portion of the housing in the direction of the optical axis, and at least three protrusions protruding from the flange protruding portion toward the first surface of the circuit board in the direction of the optical axis, the at least three protrusions include a first protrusion, a second protrusion, and a third protrusion, and the first tubular portion of the lens unit, the flange portion of the lens unit, the flange protruding portion of the flange portion, and the at least three protrusions of the flange protruding portion are integrally formed of the first resin.

8. The vehicular camera according to claim 7, wherein the first protrusion of the flange protruding portion of the flange portion of the lens unit is bonded to the first surface of the circuit board with a first adhesive, the second protrusion of the flange protruding portion of the flange portion of the lens unit is bonded to the first surface of the circuit board with a second adhesive, and the third protrusion of the flange protruding portion of the flange portion of the lens unit is bonded to the first surface of the circuit board with a third adhesive.

9. The vehicular camera according to claim 8, wherein the housing includes four side walls that are formed continuously with the second end of the housing and extend from the second end toward the second flange surface of the lens unit, the four side walls are a first side wall, a second side wall, a third side wall, and a fourth side wall, the first side wall of the housing is connected to the second side wall of the housing, the second side wall of the housing is connected to the third side wall of the housing, the third side wall of the housing is connected to the fourth side wall of the housing, and the fourth side wall of the housing is connected to the first side wall of the housing.

10. The vehicular camera according to claim 9, further comprising:

an electrical connector including a first connector end and a second connector end opposite to the first connector end, and a connector connection portion disposed on the second surface of the circuit board, wherein the electrical connector is disposed inside the second tubular portion of the housing, the first connector end of the electrical connector is electrically connected to the connector connection portion on the second surface of the circuit board, and the second connector end of the electrical connector is electrically connected to a cable of the vehicle when the vehicular camera is disposed in the vehicle.

11. The vehicular camera according to claim 10, wherein the first tubular portion of the lens unit has a circular shape in a plan view of the first tubular portion, the flange portion of the lens unit has a first rectangle in a plan view of the flange portion, the flange protruding portion of the lens unit has a second rectangle having a smaller area than the first rectangle of the flange portion in a plan view of the flange protruding portion, and the second tubular portion of the housing has a third rectangle having a larger area than the second rectangle of the flange protruding portion in a plan view of the second tubular portion.

12. The vehicular camera according to claim 11, further comprising:

a metal shield member having a third tubular shape, wherein the shield member includes a bottom surface, and four side surfaces extending from the bottom surface toward the second flange surface of the flange portion of the lens unit in the direction of the optical axis, and the four side surfaces of the shield member are a first side surface, a second side surface connected to the first side surface, a third side surface connected to the second side surface, and a fourth side surface connected to the third side surface.

13. The vehicular camera according to claim 12, further comprising:

a heat-conducting member disposed inside the third tubular portion of the shield member.

* * * * *